United States Patent
Deng et al.

(10) Patent No.: US 9,732,800 B2
(45) Date of Patent: Aug. 15, 2017

(54) TURBOCHARGER JOURNAL BEARING SYSTEM

(71) Applicant: GM Global Technology Operations LLC, Detroit, MI (US)

(72) Inventors: Dingfeng Deng, Auburn Hills, MI (US); Louis P. Begin, Rochester, MI (US); Fanghui Shi, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 279 days.

(21) Appl. No.: 14/676,277

(22) Filed: Apr. 1, 2015

(65) Prior Publication Data
US 2016/0290350 A1   Oct. 6, 2016

(51) Int. Cl.
| | | |
|---|---|---|
| F04D 17/10 | (2006.01) |
| F04D 25/04 | (2006.01) |
| F04D 29/056 | (2006.01) |
| F16C 17/26 | (2006.01) |
| F16C 35/02 | (2006.01) |
| F04D 25/02 | (2006.01) |
| F04D 29/62 | (2006.01) |
| F16C 33/10 | (2006.01) |

(52) U.S. Cl.
CPC ............ *F16C 35/02* (2013.01); *F04D 25/024* (2013.01); *F04D 29/0563* (2013.01); *F04D 29/624* (2013.01); *F16C 17/26* (2013.01); *F16C 33/1085* (2013.01); *F05D 2220/40* (2013.01); *F16C 2360/24* (2013.01)

(58) Field of Classification Search
CPC .. F04D 25/024; F04D 29/624; F04D 29/0563; F04D 17/10; F05D 2220/40; F16C 17/26; F16C 33/1085; F16C 35/02; F16C 2360/24
See application file for complete search history.

(56) References Cited

U.S. PATENT DOCUMENTS

| | | | | |
|---|---|---|---|---|
| 3,390,926 A * | 7/1968 | Woollenweber, Jr. | ......................... | F01D 25/166 384/287 |
| 3,811,741 A * | 5/1974 | McInerney | ........... | F01D 25/166 384/291 |
| 4,358,253 A * | 11/1982 | Okano | .................. | F01D 25/166 384/368 |
| 4,370,106 A * | 1/1983 | Lauterbach | ............. | F01D 25/16 384/126 |
| 4,902,144 A * | 2/1990 | Thoren | ................. | F01D 25/166 384/287 |
| 5,246,352 A * | 9/1993 | Kawakami | ........... | F01D 25/164 384/901 |

(Continued)

*Primary Examiner* — Igor Kershteyn
(74) *Attorney, Agent, or Firm* — Harness, Dickey & Pierce, P.L.C.

(57) ABSTRACT

A turbocharger is provided including a housing with a turbine and a compressor disposed in the housing. A central shaft is connected between the turbine and the compressor and is rotatably supported by a first journal bearing disposed within the housing at a location adjacent to the turbine and a second journal bearing disposed within the housing at a location adjacent to the compressor. A spacer is disposed directly between and adjacent to the first journal bearing and the second journal bearing and is neither coupled to or integrally formed with the first journal bearing.

3 Claims, 2 Drawing Sheets

(56) References Cited

U.S. PATENT DOCUMENTS

| | | | |
|---|---|---|---|
| 6,017,184 A * | 1/2000 | Aguilar | F01D 25/168 |
| | | | 415/105 |
| 7,189,005 B2 * | 3/2007 | Ward | F01D 25/166 |
| | | | 384/286 |
| 7,712,311 B2 | 5/2010 | Ren et al. | |
| 7,793,499 B2 * | 9/2010 | Gutknecht | F01D 25/166 |
| | | | 184/6.11 |
| 8,075,191 B2 * | 12/2011 | Gutknecht | F01D 25/16 |
| | | | 384/276 |
| 2003/0072509 A1 | 4/2003 | Woollenweber | |
| 2013/0255252 A1 | 10/2013 | Fonville et al. | |

* cited by examiner

TURBOCHARGER JOURNAL BEARING SYSTEM

FIELD

The present disclosure relates to a turbocharger and more particularly to a journal bearing system for a turbocharger.

BACKGROUND

This section provides background information related to the present disclosure which is not necessarily prior art.

Internal combustion engines are used to generate considerable levels of power for prolonged periods of time on a dependable basis. Many such engine assemblies employ a supercharging device, such as an exhaust gas turbine driven turbocharger, to compress the airflow before it enters the intake manifold of the engine in order to increase power and efficiency.

Specifically, a turbocharger utilizes a centrifugal gas compressor that forces more air and, thus, more oxygen into the combustion chambers of the engine than is otherwise achievable with ambient atmospheric pressure. The additional mass of oxygen-containing air that is forced into the engine improves the engine's volumetric efficiency, allowing it to burn more fuel in a given cycle, and thereby produce more power.

A typical turbocharger employs a central shaft that is supported by one or more bearings and transmits rotational motion between an exhaust-driven turbine wheel and an air compressor wheel. Both the turbine and compressor wheels are fixed to the shaft, which in combination with various bearing components constitute the turbocharger's rotating assembly. Because the rotating assembly frequently operates at speeds over 100,000 revolutions per minute (RPM), the balance of such an assembly is essential for long term durability of the turbocharger.

With reference to FIGS. 5 and 6, a conventional turbocharger 100 is shown including a turbine 102 and a compressor 104 that are connected to one another by a central shaft 106. The central shaft 106 is supported by a pair of journal bearings 108, 110 which are each adjacent to one of the corresponding turbine 102 and compressor 104, respectively. The journal bearings 108, 110 are separated from one another by an annular spacer 112 disposed there between. Each of the journal bearings 108, 110 and the annular spacer 112 are received in a housing 114 of the turbocharger 100. With reference to FIG. 6, a perspective view of the journal bearings 108, 110 and spacer 112 are shown with the exterior surface of the journal bearings 108, 110 having a recessed annular groove 116 and an aperture 118 that are utilized for delivering lubricant from a lubricant passage in the housing 114 and to the interior space between the journal bearings 108, 110 and the central shaft 106. The grooves 116 and apertures 118 are optional depending upon the lubrication strategy since some lubrication systems supply lubrication to the journal bearings through a passage in the central shaft 106. The annular spacer 112 can be provided with holes 122 that are used as an anti-rotation feature on the spacer 112.

SUMMARY

This section provides a general summary of the disclosure, and is not a comprehensive disclosure of its full scope or all of its features.

The conventional turbochargers as generally described above with reference to FIGS. 5 and 6 have exhibited sub-synchronous vibrations that provide noise, vibration and harshness (NVH) concerns. Accordingly, the present disclosure couples or integrates one of the journal bearings with the spacer so that the ring speed of one of the journal bearing can be reduced by additional drag provided by the spacer. The ring speed of the coupled or integrated bearing can be controlled by the spacer clearance or length. This feature makes the driving forces of the two bearings at different frequencies (de-synchronizing), thus reducing sub-synchronous vibration of the journal bearing system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
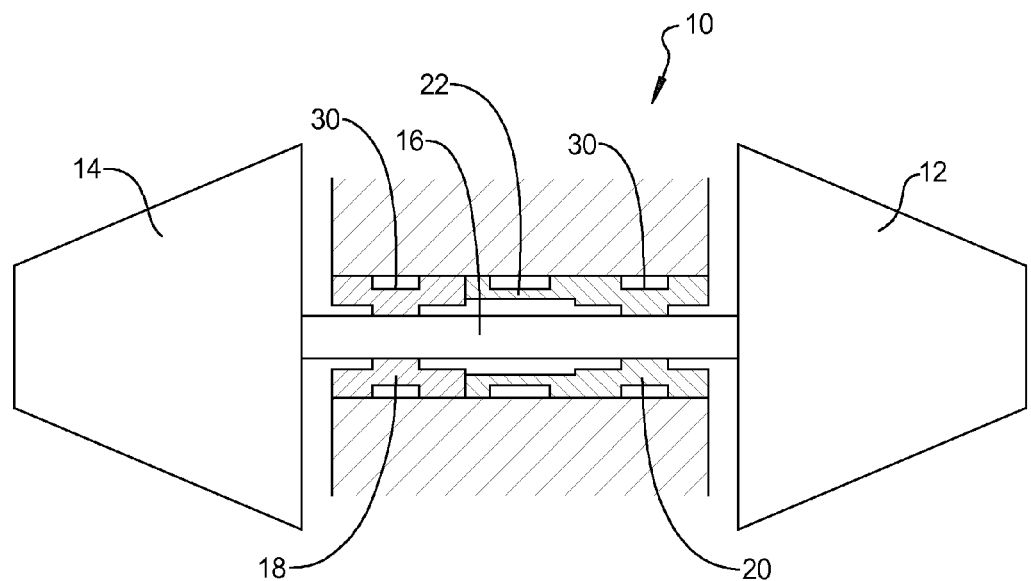
FIG. 1 is a schematic view of a turbocharger having a journal bearing system according to the principles of the present disclosure.
Figure 5:
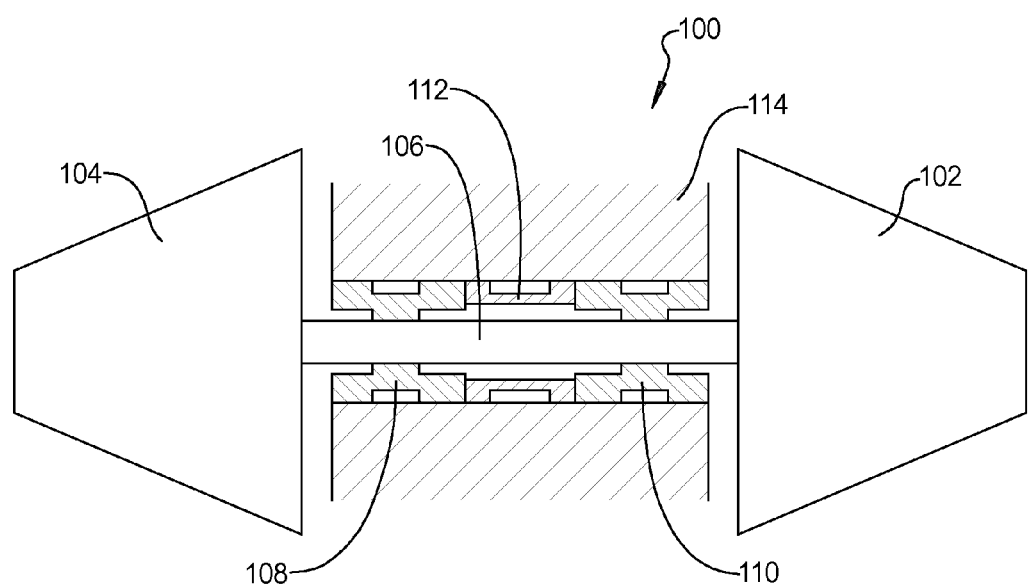
FIG. 5 is a schematic view of a turbocharger having a conventional journal bearing system.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
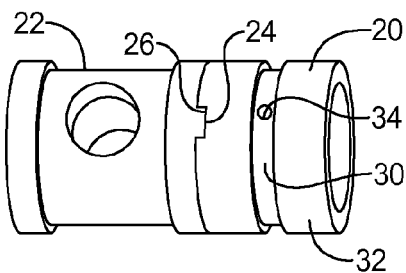
FIG. 2 is a perspective view of a spacer coupled to a journal bearing according to the principles of the present disclosure.
Figure 3:
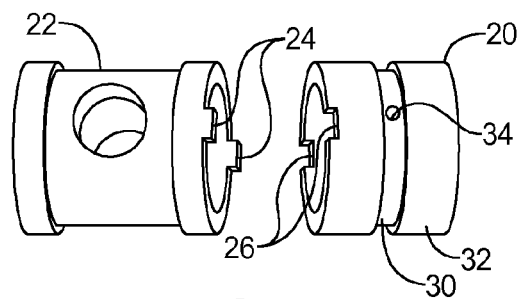
FIG. 3 is a perspective view of the spacer and journal bearing of FIG. 3.

With reference to FIGS. 1-3, a turbocharger 10 is shown including a turbine 12 and a compressor 14 that are connected to one another by a central shaft 16. The central shaft 16 is supported by a pair of journal bearings 18, 20 which are each adjacent to one of the corresponding turbine 12 and compressor 14, respectively. The journal bearings 18, 20 can each include a recessed annular groove 30 in an exterior surface 32 as well as an aperture 34 extending there through that are utilized for delivering lubricant from a lubricant passage in the housing 114 and to the interior space between the journal bearings 18, 20 and the central shaft 16. The annular grooves 30 and aperture 34 are optionally provided depending upon the lubrication technique utilized.

Figure 4:
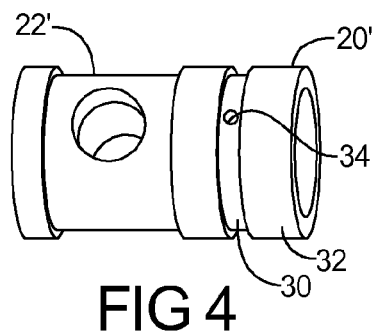
FIG. 4 is a perspective view of a spacer and journal bearing formed integral with one another according to a further aspect of the present disclosure.
Figure 6:
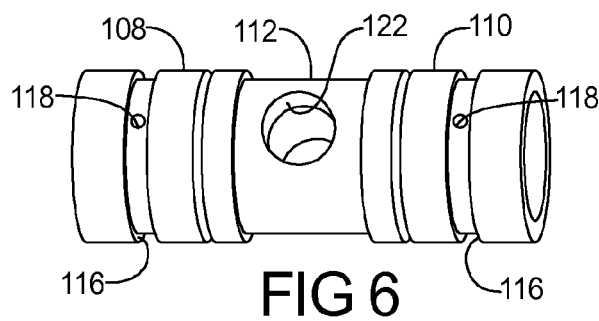
FIG. 6 is a perspective view of the conventional journal bearings and spacer shown in FIG. 5.

As shown in FIGS. 2 and 3, a spacer 22 can be coupled to the journal bearing 20. The spacer 22 can have an outer diameter region or regions that are equal in diameter to the first and second journal bearings 18, 20. The inner diameter of the spacer 22 is preferably larger in diameter than the inner diameter of the journal bearings 18, 20 so that the spacer 22 does not provide any contact with the central shaft 16. The journal bearing 20 and the spacer 22 can each be provided with one or more protruding members 24 and recess portions 26 that can engage the spacer 22 to be rotatable with the journal bearing 20. Alternatively, other coupling mechanisms can be utilized for connecting the spacer 22 to the journal bearing 20. It should be noted that the protruding members 24 and recess portions 26 can be beveled, dovetailed or otherwise angled to further enhance the coupling engagement between the journal bearing 20 and the spacer 22. As an further alternative, as illustrated in FIG. 4, the spacer portion 22' can be formed integral with the journal bearing 20' so that the spacer portion 22' and of the journal bearing 20' are formed as a single piece. The coupling or integration of the spacer portion 22/22' with the journal bearing 20/20' provides additional drag on the journal bearing 20/20' so that a rotational speed of the journal bearing 20/20' is reduced relative to the journal bearing 18. The ring speed of the coupled or integrated bearing 20/20' can be controlled by the spacer clearance or length. The combination of the outer diameter and width of the spacer 22 are selected to set the journal bearing 20/20' velocity and, to a lesser degree, the damping behavior of the journal bearing 20/20', further optimizing the bearing geometry to reduce sub-synchronous vibration. This feature makes the driving forces of the two bearings 18, 20/20' at different frequencies (de-synchronizing), thus reducing sub-synchronous vibration. The reduction of sub-synchronous vibration reduces the noise and vibrations of the turbocharger.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A turbocharger, comprising:
   a housing;
   a turbine disposed in the housing;
   a compressor disposed in the housing;
   a central shaft connected between the turbine and the compressor;
   a first journal bearing disposed within the housing and supporting the central shaft at a location adjacent to the turbine and a second journal bearing disposed within the housing and supporting the central shaft at a location adjacent to the compressor; and
   a spacer disposed directly between and adjacent the first journal bearing and the second journal bearing and coupled for rotation with the first journal bearing, wherein at least one of the spacer and the first journal bearing include protruding engagement feature extending from a side surface thereof and received in a recess formed in a side surface of the other of the at least one of the spacer and the first journal bearing for rotatably engaging the spacer and the first journal bearing together.

2. The turbocharger according to claim 1, wherein the first and second journal bearings include exterior surfaces with a recessed annular groove.

3. The turbocharger according to claim 2, wherein the first and second journal bearings include an aperture extending from the recessed annular groove to an interior surface thereof.

* * * * *